Patented Jan. 11, 1927.

1,614,348

UNITED STATES PATENT OFFICE.

LIONEL CRESSON, OF SINGAPORE, STRAITS SETTLEMENTS.

TERRA-CAOUTCHOUC BLOCK.

No Drawing. Application filed October 20, 1922. Serial No. 595,873.

My said invention relates to a novel composition of matter which I prefer to designate by the appellation "terra caoutchouc" for the reason that by its aid a rubber facing lining or covering may be attached by any of the ordinary vulcanizing processes to almost anything on earth, the said attachment being firm and indissoluble. My invention also relates to a method of making such a composition.

One object of my invention is to provide a practical method for making rubber roads. It has hitherto been found impossible to attach a rubber facing to road-surfaces except by mechanical means such, e. g. as clamps. A road could of course be made solely from blocks of rubber but this would be impracticable by reason of expense. Blocks or sheets of rubber may however be securely attached to slabs of my composition and will form a durable road.

Another object is to provide a practical means and method for covering floors with rubber. Thick sheets of rubber for this purpose are undesirably expensive and thin sheets show up all irregularities in the floor-boards, besides wearing irregularly on account of such irregularities. A thick sheet of my composition may be secured to the floor and a thin sheet of the more expensive rubber vulcanized to it thus forming a cheap and durable floor covering.

It is sometimes desirable to cover a wall with thin sheets of rubber of various colors. The adhesive ordinarily used (as rubber solution or glue) soon loses its effectiveness due to the inevitable presence of dampness, particularly at the edges of the sheets. The edges then curl up, and the entire sheet is apt to be torn off its seat by wind and weather or otherwise.

In the practice of my invention rubber latex, either fresh or preserved by the use of some anti-coagulant such as ammonia, is mixed with any suitable material whether of animal, vegetable or mineral origin to form, after suitable treatment, what might well be known as rubber concrete, the latex supplanting the Portland cement used in ordinary concrete. The filling material may be sand and gravel as in ordinary concrete work or may be broken stone, natural or baked clay, cement, slag, earth, woody or fibrous materials, leather, metal filings or fragments, or other filling according to the use intended to be made of the furnished composition.

Rubber compounding ingredients either organic or inorganic may be added such for example as sulphur, metallic oxides and sulphides, petroleum residue by itself or with other compounding substances, etc. according to the vulcanizing conditions and the desired qualities of the product such as hardness, flexibility, etc.

The latex may be in its natural state or diluted and a coagulating agent may be added if necessary, the process being varied in accordance with the nature of the filling materials used as well as other conditions. For instance, certain materials will serve to acidify and coagulate the latex while others will not. If a coagulating agent is required it is best added at intervals to a batch of the mixture while being churned or agitated in an ordinary concrete mixer or by any other desirable means until the latex has coagulated completely. After this the mixture may be compressed and shaped by a series of rollers or by any other conventional or desirable means into any desirable form such as blocks, slabs, sheets, tiles, etc.

The formed objects are dried by exposure to the sun or by artificial means, after which they are ready to be vulcanized. Prior to vulcanization they may have a layer or facing of rubber attached thereto to be vulcanized with the object of forming an indissoluble union. Unvulcanized rubber can be attached to vulcanized objects or vulcanized rubber to unvulcanized objects and the parts then united by vulcanizing all with equal facility.

The following formulas have been used, and are recited for purposes of illustration only without in any way limiting the invention thereto.

A. Sawdust, 1 kg. 500 gms.; latex, 1 liter; litharge, 0 kg. 300 gms.; sulphur, 0 kg. 150 gms.; tar, 0 kg. 100 gms.; water, 1 liter.

B. Baked clay, 1 kg.; sand, 1 kg.; granite, 1 kg.; asphalt, 0 kg. 200 gms.; latex, 1 liter; litharge, 0 kg. 100 gms.; sulphur, 0 kg. 200 gms.; kaolin, 0 kg. 500 gms.

Having thus fully described my said invention, what I claim as new and desire to secure by Letters Patent, is:

1. A structure comprising a layer containing rubber latex and filling material, and a relatively thin covering layer of rubber vulcanized to the first layer, substantially as set forth.

2. A protecting structure for roads, floors and the like comprising an under layer of rubber coated concretions and a facing layer of rubber, all simultaneously vulcanized into one integral slab, substantially as set forth.

3. A structure comprising a layer containing rubber latex coated filling material, and a relatively thin ornamental rubber surface layer, the filling material and thin layer and the surface of contact therebetween all being joined by vulcanization, substantially as set forth.

In witness whereof, I have hereunto set my hand and seal at Singapore, Straits Settlements this fifth day of September, A. D. nineteen hundred and twenty-two.

LIONEL CRESSON. [L. S.]